United States Patent
Xu et al.

(10) Patent No.: US 11,170,167 B2
(45) Date of Patent: Nov. 9, 2021

(54) AUTOMATIC LEXICAL SEMEME PREDICTION SYSTEM USING LEXICAL DICTIONARIES

(71) Applicant: TENCENT AMERICA LLC, Palo Alto, CA (US)

(72) Inventors: Kun Xu, Bellevue, WA (US); Chao Weng, Fremont, CA (US); Chengzhu Yu, Bellevue, WA (US); Dong Yu, Bothell, WA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 161 days.

(21) Appl. No.: 16/364,777

(22) Filed: Mar. 26, 2019

(65) Prior Publication Data

US 2020/0311196 A1 Oct. 1, 2020

(51) Int. Cl.
 *G06F 40/274* (2020.01)
 *G06F 40/30* (2020.01)
 *G06F 40/232* (2020.01)
 *G06F 40/284* (2020.01)

(52) U.S. Cl.
 CPC .......... *G06F 40/274* (2020.01); *G06F 40/232* (2020.01); *G06F 40/284* (2020.01); *G06F 40/30* (2020.01)

(58) Field of Classification Search
 USPC ................................................. 704/9, 1–504
 See application file for complete search history.

(56) References Cited

U.S. PATENT DOCUMENTS

| | | | | |
|---|---|---|---|---|
| 7,487,095 | B2* | 2/2009 | Hill | G10L 15/1822 704/275 |
| 7,606,714 | B2* | 10/2009 | Williams | G10L 13/027 704/275 |
| 8,000,973 | B2* | 8/2011 | Williams | H04M 3/493 704/275 |
| 9,384,265 | B2* | 7/2016 | Tinkler | G06F 40/242 |
| 10,380,241 | B2* | 8/2019 | Child | G06F 3/018 |
| 2004/0093322 | A1* | 5/2004 | Peralta | G06F 40/20 |
| 2004/0162724 | A1* | 8/2004 | Hill | G10L 15/1822 704/231 |

(Continued)

FOREIGN PATENT DOCUMENTS

| CN | 104699819 A | 6/2015 |
|---|---|---|
| CN | 104361026 B | 9/2017 |

OTHER PUBLICATIONS

Feng et al., "Employing Morphological Structures and Sememes for Chinese Event Extraction", Proceedings of COLING 2012, Dec. 2012, retrieved from URL: <https://www.aclweb.org/anthology/C12-1099.pdf>, pp. 1619-1634.

(Continued)

*Primary Examiner* — Marcus T Riley
(74) *Attorney, Agent, or Firm* — Sughrue Mion, PLLC

(57) ABSTRACT

Method and apparatus for automatically predicting lexical sememes using a lexical dictionary, comprising inputting a word, retrieving the word's semantic definition and sememes corresponding to the word from an online dictionary, setting each of the retrieved sememes as a candidate sememe, inputting the word's semantic definition and candidate sememe, and estimating the probability that the candidate sememe can be inferred from the word's semantic definition.

16 Claims, 5 Drawing Sheets

(56) References Cited

U.S. PATENT DOCUMENTS

| | | | | |
|---|---|---|---|---|
| 2005/0105712 A1* | 5/2005 | Williams | ............ | H04M 3/5166 |
| | | | | 379/265.02 |
| 2006/0080107 A1* | 4/2006 | Hill | ..................... | G10L 15/1822 |
| | | | | 704/275 |
| 2008/0270384 A1* | 10/2008 | Tak | ........................ | G06F 16/367 |
| 2009/0228264 A1* | 9/2009 | Williams | ............ | H04M 3/5166 |
| | | | | 704/9 |
| 2013/0006975 A1* | 1/2013 | Li | ........................ | G06F 40/247 |
| | | | | 707/723 |
| 2013/0179155 A1* | 7/2013 | Tinkler | ................ | G06F 16/322 |
| | | | | 704/10 |
| 2014/0149103 A1* | 5/2014 | Child | ..................... | G06F 3/018 |
| | | | | 704/8 |
| 2014/0280314 A1* | 9/2014 | Coleman | ................ | G06F 16/21 |
| | | | | 707/769 |
| 2015/0294588 A1* | 10/2015 | Kullok | ................... | A61B 5/743 |
| | | | | 434/236 |
| 2015/0294589 A1* | 10/2015 | Kullok | ..................... | G09B 7/02 |
| | | | | 434/236 |
| 2015/0294590 A1* | 10/2015 | Kullok | ................... | A61B 5/743 |
| | | | | 434/236 |
| 2015/0294591 A1* | 10/2015 | Kullok | ..................... | G09B 7/02 |
| | | | | 434/236 |
| 2020/0311196 A1* | 10/2020 | Xu | ......................... | G06F 40/30 |

OTHER PUBLICATIONS

International Search Report and Written Opinion dated May 22, 2020 by the International Searching Authority in application No. PCT/US2020/018948.

Ruobing Xie, et al., "Lexical Sememe Prediction via Word Embeddings and Matrix Factorization", Proceedings of the Twenty-Sixth International Joint Conference on Artificial Intelligence (IJCAI-17), 2017, pp. 4200-4206 (7 pages total).

Huiming Jin, et al., "Incorporating Chinese Characters of Words for Lexical Sememe Prediction", Proceedings of the 56th Annual Meeting of the Association for Computational Linguistics (Long Papers), Melbourne, Australia, Jul. 15-20, 2018, pp. 2439-2449 (11 pages total).

* cited by examiner

| Method | $MAP_{sub}$ | $MAP_{full}$ |
|---|---|---|
| Xie et al. (2017) | | |
| w/ Sogou embeddings | 53.7% | - |
| w/ fastText embeddings | 52.8% | - |
| CNN based | 31.6% | 30.9% |
| Bi-LSTM based | 32.3% | 31.2% |
| + 1-layer self-attention | 34.1% | 33.1% |
| matching based (Ours) | | |
| w/ random sampling | 59.6% | 58.1% |
| w/ frequency based sampling | 60.2% | 58.5% |
| w/ embedding based sampling | 60.7% | 59.7% |
| w/ confusion matrix based sampling | 61.7% | 60.5% |

FIG. 5

AUTOMATIC LEXICAL SEMEME PREDICTION SYSTEM USING LEXICAL DICTIONARIES

BACKGROUND

Field

Methods and apparatuses relate to information technologies, and in particular, to a sememe extraction method, a computer device, and a storage medium.

Description of Related Art

A sememe may generally be defined as a smallest semantic unit. Existing sememe prediction methods may use word embeddings to predict sememes. Wording embedding in this context may generally refer to the set of language modeling and feature learning techniques in natural language processing (NLP), where words or phrases from a vocabulary are mapped to vectors of real numbers.

These existing sememe prediction methods that use word embeddings however may not only fail to provide an accurate prediction based on low-frequency words whose embeddings are not learned but also may be sensitive to the embedding quality.

For example, Xie et al. (2017) describes a sememe prediction method to predict sememes of a word by measuring the similarity between jointly learned word embeddings and sememe embeddings. Specifically, the reference discusses Sememe Prediction with Word Embeddings (SPWE) and Sememe Prediction with Sememe Embeddings (SPSE), which are inspired by collaborative filtering and matrix factorization, respectively. The described SPWE predicts the sememes of words that are close to the unlabeled word in the embedding space. The disclosed SPSE learns sememe embeddings by matrix factorization within the same embedding space of words, and recommends the most relevant sememes to the unlabeled word in the embeddings space.

Also, Jin et al. (2018) describes a method that additionally considers character information but uses the similar embedding based similarity methods to predict lexical sememes.

The prediction methods proposed by Xie et al. (2017) and Jin et al. (2018) are relatively simple and straightforward. However, when applying these methods to real-word applications, oftentimes, users do not have access to accurately learned word embeddings. This is especially true for new words. This is because it is hard to collect enough context data for learning the embeddings of new words, and in a majority of deep learning applications, the word embeddings are fixed after training, making it difficult to learn the embedding of the new words and to fix them into a system employing the methods proposed by Xie et al. (2017) and Jin et al. (2018).

Effects and Advantages of Certain Embodiments

In light of the above technical problems, the inventors propose a novel sememe prediction method, computer device, and a storage medium, that, in some embodiments, leverages online word dictionaries. Certain embodiments of this prediction method, computer device, and a storage medium have been inspired by how human beings understand a word, that is, reading its semantic definition from a dictionary.

Compared with word embeddings, dictionary entries can provide more accurate semantic definitions and have broader coverage on low-frequency words. Consequently, embodiments of the sememe prediction method, computer device, and a storage medium formulate sememe prediction using multi-label text classification. Embodiments take a word's definition as input and predict the word's multiple sememes. Here, in some embodiments, the prediction of each sememe label is a binary classification task.

In some embodiments, with regards to the text classification task, since target sememe labels themselves are meaningful texts, embodiments are able to fully explore valuable information inside sememe labels, instead of treating each sememe label as an abstract symbol. Thus, a benefit realized by some embodiments is the formulation of each binary sememe classification as text matching, and predicting according to the semantic relevance between an input word definition and a sememe.

A lexical knowledge base may contain a large number (e.g., thousands) of sememes. Generally, based on known techniques, it is time-consuming to treat all incorrect sememes of one training instance as its negative labels. Certain embodiments of the instant disclosure may address this problem with a negative sampling strategy that may sample negative sememe labels from a noise distribution.

For example, two sampling strategies in some embodiments establish the above noise distributions based on embeddings similarities or based on a confusion matrix between sememes, in order to select the most competitive negative labels for accelerating model training.

That is, certain embodiments of the instant disclosure utilize a word's dictionary entry that has an accurate semantic definition and broader coverage to predict sememes. Certain embodiments employ a text matching model to capture the semantic relevance between the word definition and sememe, and may use two negative sampling methods to improve the robustness of the prediction model.

Experimental results, for example, those shown in FIG. 5 show that certain embodiments of the instant disclosure outperform existing baselines by a large margin and further, the negative sampling methods of certain embodiments significantly improve the performance thereof.

SUMMARY

One or more embodiments provide a sememe prediction method, a computer device, and a storage medium.

According to an aspect of an embodiment, there is provided a sememe prediction method performed by at least one computer processor that includes inputting a word, retrieving the word's semantic definition and sememes corresponding to the word from an online dictionary, setting each of the retrieved sememes as a candidate sememe, for each candidate sememe, inputting the word's semantic definition and candidate sememe, and, for each of the candidate sememes, estimating the probability that the candidate sememe can be inferred from the word's semantic definition.

According to an aspect of an embodiment, there is provided a sememe prediction device comprising: at least one memory configured to store program code; at least one processor configured to read the program code and operate as instructed by the program code, the program code including: first inputting code configured to cause said at least one processor to input a word, retrieving code configured to cause said at least one processor to retrieve the word's semantic definition and sememes corresponding to the word from an online dictionary, setting code configured to cause said at least one processor to set each of the retrieved sememes as a candidate sememe, second inputting code configured to cause said at least one processor to, for each candidate sememe, input the word's semantic definition and candidate sememe, and probability estimation code configured to cause said at least one processor to, for each of the candidate sememes, estimate the probability that the candidate sememe can be inferred from the word's semantic definition.

According to an aspect of an embodiment, there is provided a sememe prediction non-transitory computer-readable medium storing instructions, the instructions comprising: one or more instructions that, when executed by one or more processors of a device, cause the one or more processors to: input a word, retrieve the word's semantic definition and sememes corresponding to the word from an online dictionary, set each of the retrieved sememes as a candidate sememe, for each candidate sememe, input the word's semantic definition and candidate sememe, and for each of the candidate sememes, estimate the probability that the candidate sememe can be inferred from the word's semantic definition.

BRIEF DESCRIPTION OF THE DRAWINGS

FIG. 5 is a diagram of experimental test results, according to embodiments.

DETAILED DESCRIPTION

To make the objectives, technical solutions, and advantages of this application be more clear and comprehensible, embodiments will be further described in detail with reference to the accompany drawings. It should be understood that, the specific implementations described herein are only used for interpreting this application, rather than limiting this application.

Figure 1:
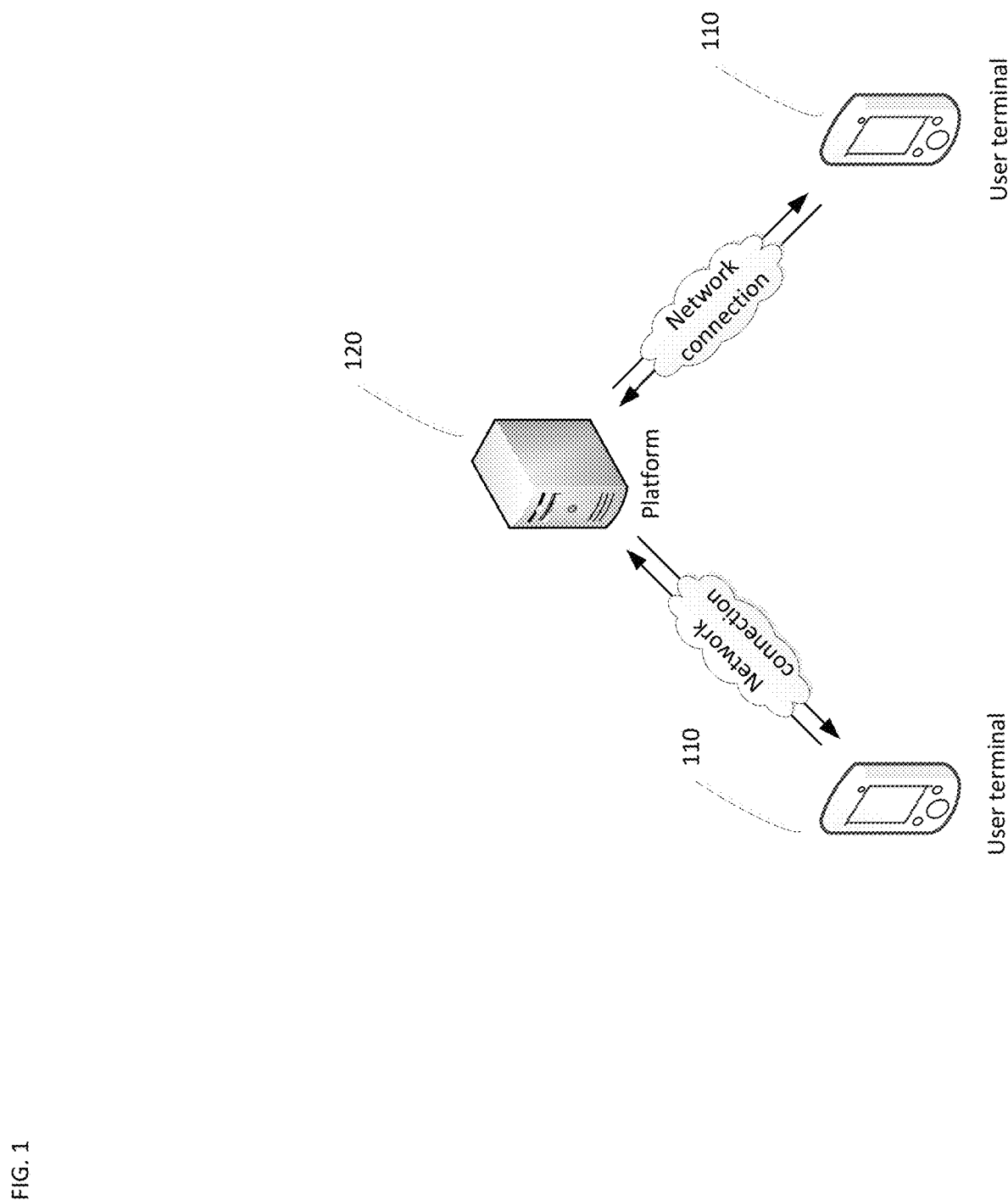
FIG. 1 is a diagram of an environment in which methods, apparatuses and systems described herein may be implemented, according to embodiments.

FIG. 1 is a schematic diagram of an application environment of a sememe prediction method according to an embodiment. As shown in FIG. 1, the application environment includes user terminals 110 and a server 120, and the user terminals 110 are in communication with the server 120. A user enters text, for example, a Chinese word, through one of the user terminals 110, the entered text is sent to the server 120 through a communications network, the server 120 processes the entered text, and predicts a corresponding sememe for the entered text. Alternatively, the user enters text through one of the user terminals 110, the user terminal 110 processes the entered text, predicts a corresponding sememe for the entered text, and sends the predicted sememe to the server 120 through a communications network, which may in turn send the predicted sememe to the other of the user terminal 110.

Figure 2:
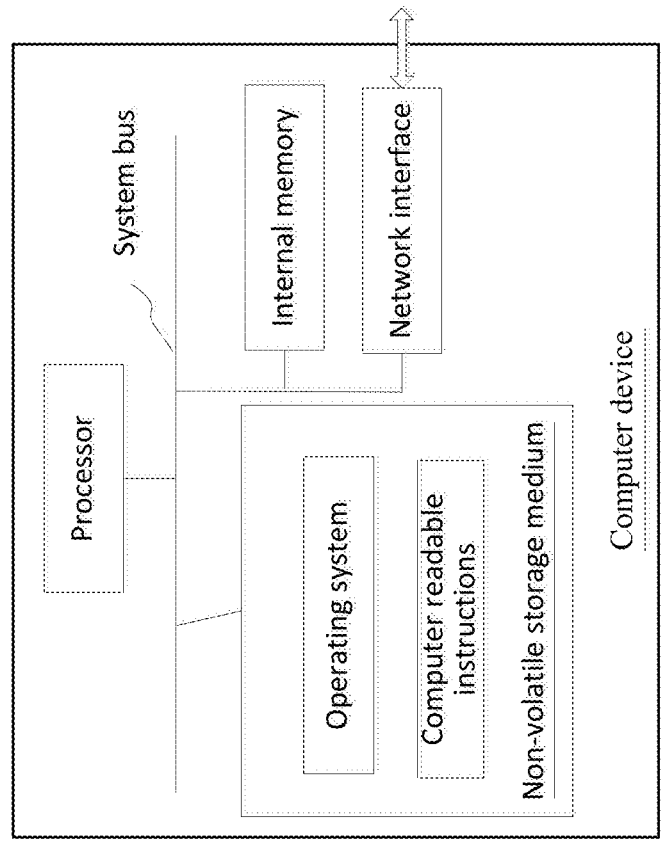
FIG. 2 is a diagram of example components of one or more devices of FIG. 1.

FIG. 2 is a schematic diagram of an internal structure of a computer device according to an embodiment. The computer device may be a user terminal or a server. As shown in FIG. 2, the computer device includes a processor, a memory, and a network interface that are connected through a system bus. The processor is configured to provide computation and control ability, to support operation of the computer device. The memory includes a non-volatile storage medium and an internal memory. The non-volatile storage medium may store an operating system and computer readable instructions, and the internal memory provides an environment for running the operating system and the computer readable instructions in the non-volatile storage medium. When the computer readable instructions are executed by the processor, the processor may perform a sememe prediction method. The network interface is configured to perform network communication with an external terminal.

Embodiments are not limited to the structure shown in FIG. 2, and various changes may be made without departing from the scope of the present disclosure. Specifically, for example, the computer device may include more or less members than those in FIG. 2, or include a combination of two or more members, or include different member layouts.

Figure 3:
FIG. 3 is a diagram of a sememe prediction method, according to embodiments.

Referring to FIG. 3, in an embodiment, a sememe prediction method is provided. The sememe method is run in the server 120 shown in FIG. 1 based on text received from, for example, a user terminal 110. The sememe prediction method includes the following steps:

S310: Obtain word.

Generally, the word will be a Chinese word, such as "辙乱旗靡". However the word is not limited to a Chinese word and may be a word of a different language.

In an implementation, before step 310, the method further includes a step of obtaining the word from a user who enters text through a user terminal, the user terminal transmits the text through a communication network, and a server obtains the text entered by the user from the user terminal through a communications network.

S320: Retrieve the word's semantic definition D from an online dictionary.

The online dictionary and semantic definition D may be accessed in a number of ways. For example, the online dictionary and semantic definition D may be accessed automatically, or may be accessed by a user interacting with a user terminal. Further, although an online dictionary is used in this embodiment, the application is not so limited. For example dictionaries that are not online may be used to retrieve the word's semantic definition. Also, other types of definitions may be retrieved.

S330: Apply a prediction model to estimate the probability that a sememe can be inferred from the semantic definition D.

A sememe prediction model according to an embodiment will be described below.

S340: Normalize the probability.

The probability here may be normalized in any number of ways.

S350: Use a threshold to select predicted sememes.

Here, a predetermined probability threshold may be selected based on the probability to select, and present the predicted sememes to a user, by way of, for example, a user terminal.

In some embodiments, multiple thresholds or no thresholds may be used.

S360: Present the selected sememes to a user.

Here, the selected sememes may be presented to a user via, for example, a user terminal 110. However, the selected sememes may be presented to a user in a different manner.

The Prediction model mentioned in FIG. 3 will now be described. The prediction model may be a Dict2Sem model 400.

The Dict2Sem model 400 may be applied for each candidate sememe 420, such as, for the example Chinese word 410, e.g., "辙乱旗靡", a candidate sememe 420 may be, e.g., "输掉" (lose in English). The Dict2Sem model 400 may be used to estimate the probability that a sememe S can be inferred from the semantic definition D. In this case, the semantic definition D corresponds to the example Chinese word 410, e.g., "辙乱旗靡".

Figure 4:
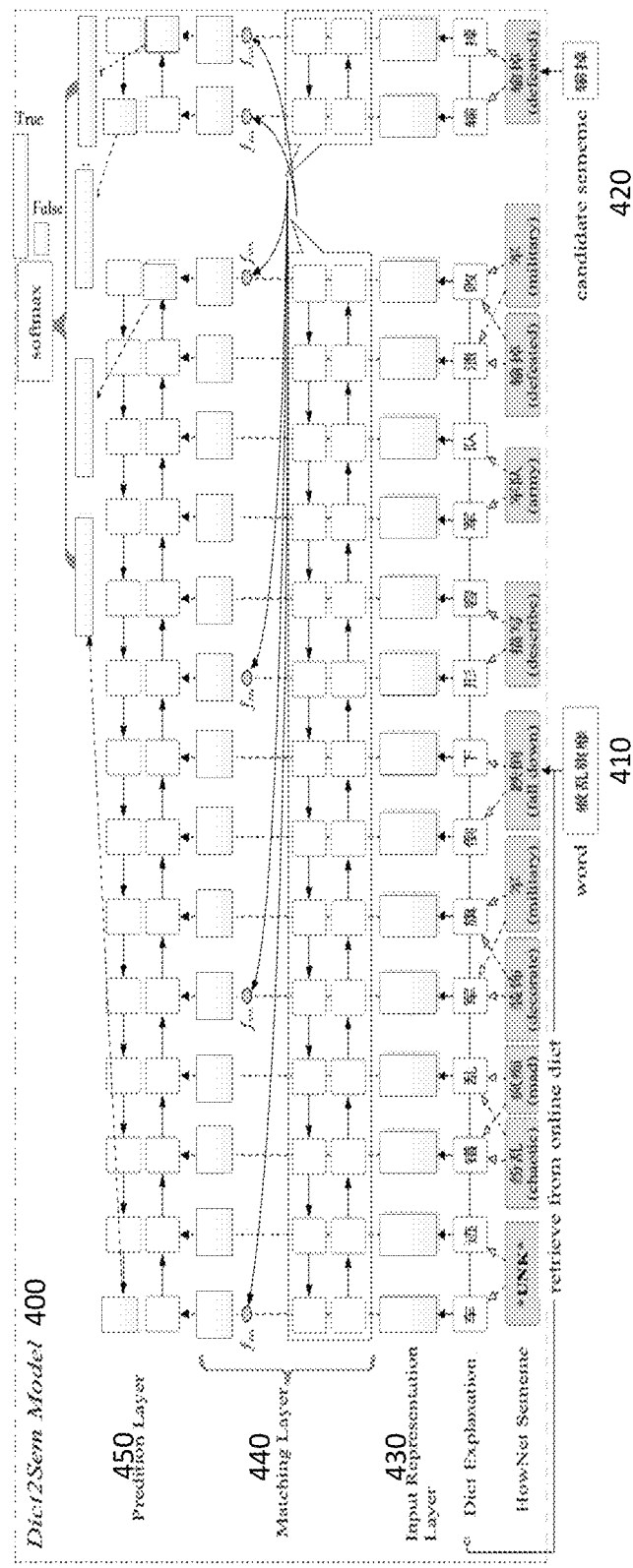
FIG. 4 is a diagram of a prediction model, according to embodiments.

The Dict2Sem model 400 illustrated in FIG. 4 may include the following three layers.

430: Input Representation Layer. Input into the Dict2Sem model 400 may comprise of two parts. As to the first part, the semantic definition D and a candidate sememe 420 may be input as a sequence of characters (e.g., Chinese), rather as segmented words. As to the second part, segmentation over the semantic definition D and the candidate sememe 420 may be performed using, for example, Standford CoreNLP, resulting in a sequence of segmented words.

The Input Representation Layer 430 may also include the construction of a vector for each character in the semantic dictionary D and the candidate sememe 420 by concatenating its character and sememe embedding which averages embeddings of all assigned sememes. In some embodiments, both of the character and sememe embeddings may be randomly initialized. Also, the model may comprise more or less than two inputs. That is the Input Representation Layer 430 may be configured to have more than two inputs or less than two inputs.

440: Matching Layer. The Matching Layer 440 may utilize a bi-directional long short-term memory (Bi-LSTM) model to encode contextual embeddings for each time-step of the semantic definition D and candidate sememe 420. Further, the Matching Layer 440 may compare each contextual embedding of one sentence against all contextual embeddings of another sentence. However, the Matching Layer 440 is not necessarily limited as such.

450 Prediction Layer. In the Prediction Layer 450, another Bi-LSTM model may be applied to the two sequences of matching vectors individually. Then, a final fixed-length matching vector may be constructed by concatenating vectors from the last time-step of the Bi-LSTM models. The Prediction Layer 450 may also employ a two-layer feed-forward neural network to consume the fixed-length matching vector and apply a Softmax function in the output layer.

Although not shown in FIG. 4, the Dict2Sem model 400 may be utilized after training. This training may include any one of the following four training methods: random sampling, frequency based sampling, embedded based sampling, and confusion matrix sampling. Of course these methods may also be combined. In addition, other training methods may also be used.

Briefly, regarding the embedded based sampling, this method may establish noise distribution from sememe embeddings at each training epoch. Regarding the confusion matrix based sampling, this method may establish the noise distribution from the confusion matrix, which is built by analyzing prediction results on the training data at each training epoch.

Although the above model was described with detailed particularity, other prediction models may also be used. That is, the application is not limited to the Dict2Sem model.

The sememe prediction apparatus corresponds to the sememe prediction method, and the specific technical features in the apparatus that correspond to the method are not repeated herein.

A person of ordinary skill in the art may understand that all or some of the modules, units, components and procedures of the foregoing embodiments may be implemented by a computer program instructing relevant hardware. The program may be stored in a non-volatile computer readable storage medium. When the program is executed, the program may control the hardware to execute the procedures of the embodiments of each foregoing method. Any usage of a memory, storage, a database or other media in each embodiment of this application may include non-volatile and/or volatile memories. The non-volatile memory may include a read-only memory (ROM), a programmable ROM (PROM), an electrically programmable ROM (EPROM), an electrically erasable programmable ROM (EEPROM), or a flash memory. The volatile memory may include a random access memory (RAM) or an external cache memory. For description, rather than for limitation, RAM may be in various forms, for example, a static RAM (SRAM), a dynamic RAM (DRAM), a synchronous DRAM (SDRAM), a double data rate SDRAM (DDRSDRAM), an enhanced SDRAM (ESDRAM), a Synchlink DRAM (SLDRAM), a Rambus direct RAM (RDRAM), a directly memory bus dynamic RAM (DRDRAM), and a memory bus dynamic RAM (RDRAM).

Each technical feature in the foregoing embodiments may be combined randomly. For simplified description, not all possible combinations of each technical feature in the foregoing embodiments are described. However, the combinations of the technical features shall be considered to fall within the scope of the specification as long as the combinations are not contradictory. The foregoing embodiments only describe several implementations of this application, and their description is specific and detailed, but cannot therefore be construed as a limitation to the patent scope of the present disclosure. It should be noted that a person of ordinary skill in the art may further make variations and improvements without departing from the conception of this application, and these all fall within the protection scope of this application. Therefore, the patent protection scope of this application should be subject to the appended claims.

What is claimed is:

1. A sememe prediction method performed by at least one computer processor, the method comprising:
    inputting a word,
    retrieving the word's semantic definition and sememes corresponding to the word from an online dictionary,
    setting each of the retrieved sememes as a candidate sememe,
    for each candidate sememe, inputting the word's semantic definition and candidate sememe,
    inputting the word's semantic definition and candidate sememe as a sequence of Chinese characters, and
    for each of the candidate sememes, estimating a probability that the candidate sememe can be inferred from the word's semantic definition, wherein the estimation probability further includes:
    for each of the candidate sememes, performing segmentation over the word's semantic definition and candidate sememe so as to obtain a sequence of segmented words, and
    constructing a vector for each character in the word's semantic definition and candidate sememe by concatenating characters and sememe embeddings and averaging embeddings of all candidate sememes.

2. The method of claim 1, wherein, the estimation probability further include performing the vector construction by having the character and sememe embeddings randomly initialized.

3. The method of claim 2, wherein the probability estimation further includes:
utilizing a bi-directional long short-term memory (Bi-LSTM) model to encode contextual embeddings for each of time-steps of the word's semantic definition and candidate sememe, and
comparing each of the contextual embeddings of one sentence against all contextual embeddings of another sentence.

4. The method of claim 3, wherein the probability estimation further includes:
applying another bi-directional long short-term memory (Bi-LSTM) model to two sequences of matching vectors individually,
constructing a final fixed-length matching vector by concatenating vectors from a last time-step of the bi-directional long short-term memory (Bi-LSTM) models, and
employing a two-layer feed-forward neural network to consume the final fixed-length matching vector.

5. The method of claim 4, wherein the probability estimation further comprises applying a Softmax function.

6. The method of claim 1, wherein the probability estimation comprising training a model.

7. The method of claim 6, wherein the training includes employing at least one of random sampling, frequency based sampling, embedded based sampling, and confusion matrix sampling.

8. The method of claim 1, the method further comprising outputting the candidate sememe with a highest probability of being inferred from the word's semantic definition.

9. A device, comprising:
at least one memory configured to store program code;
at least one processor configured to read the program code and operate as instructed by the program code, the program code including:
first inputting code configured to cause said at least one processor to input a word,
retrieving code configured to cause said at least one processor to retrieve the word's semantic definition and sememes corresponding to the word from an online dictionary,
setting code configured to cause said at least one processor to set each of the retrieved sememes as a candidate sememe,
second inputting code configured to cause said at least one processor to, for each candidate sememe, input the word's semantic definition and candidate sememe and input the word's semantic definition and candidate sememe as a sequence of Chinese characters, and
probability estimation code configured to cause said at least one processor to, for each of the candidate sememes, estimate a probability that the candidate sememe can be inferred from the word's semantic definition, wherein the probability estimation code is further configured to cause said at least one processor to:
for each of the candidate sememes, perform segmentation over the word's semantic definition and candidate sememe so as to obtain a sequence of segmented words, and
construct a vector for each character in the word's semantic definition and candidate sememe by concatenating characters and sememe embeddings and averaging embeddings of all candidate sememes.

10. The device of claim 9, wherein the probability estimation code is further configured to cause said at least one processor to construct the vector by having the character and sememe embeddings be randomly initialized.

11. The device of claim 10, wherein the probability estimation code is further configured to cause said at least one processor to:
utilize a bi-directional long short-term memory (Bi-LSTM) model to encode contextual embeddings for each of time-steps of the word's semantic definition and candidate sememe, and
compare each of the contextual embeddings of one sentence against all contextual embeddings of another sentence.

12. The device of claim 11, wherein the probability estimation code is further configured to cause said at least one processor to:
apply another bi-directional long short-term memory (Bi-LSTM) model to two sequences of matching vectors individually,
construct a final fixed-length matching vector by concatenating vectors from a last time-step of the bi-directional long short-term memory (Bi-LSTM) models, and
employ a two-layer feed-forward neural network to consume the final fixed-length matching vector.

13. The device of claim 12, wherein the probability estimation code is further configured to cause said at least one processor to apply a Softmax function.

14. The device of claim 9, wherein the probability estimation code is further configured to cause said at least one processor to train a model used to estimate the probability that the candidate sememe can be inferred from the word's semantic definition.

15. The device of claim 9, wherein the probability estimation code is further configured to cause said at least one processor to employ at least one of random sampling, frequency based sampling, embedded based sampling, and confusion matrix sampling.

16. A non-transitory computer-readable medium storing instructions, the instructions comprising: one or more instructions that, when executed by one or more processors of a device, cause the one or more processors to:
input a word,
retrieve the word's semantic definition and sememes corresponding to the word from an online dictionary,
set each of the retrieved sememes as a candidate sememe,
input the word's semantic definition and candidate sememe as a sequence of Chinese characters,
for each candidate sememe, input the word's semantic definition and candidate sememe, and
for each of the candidate sememes, estimate the probability that the candidate sememe can be inferred from the word's semantic definition, and wherein the estimation probability further includes:
for each of the candidate sememes, perform segmentation over the word's semantic definition and candidate sememe so as to obtain a sequence of segmented words, and
construe a vector for each character in the word's semantic definition and candidate sememe by concatenating characters and sememe embeddings and averaging embeddings of all candidate sememes.

* * * * *